US012659881B2

(12) United States Patent
Sun et al.

(10) Patent No.: US 12,659,881 B2
(45) Date of Patent: Jun. 16, 2026

(54) TIME DIVISION MULTIPLEXING SOUNDING REFERENCE SIGNAL PORTS

(71) Applicant: Apple Inc., Cupertino, CA (US)

(72) Inventors: Haitong Sun, Cupertino, CA (US); Huaning Niu, San Jose, CA (US); Oghenekome Oteri, San Diego, CA (US); Dawei Zhang, Saratoga, CA (US); Chunxuan Ye, San Diego, CA (US); Xiang Chen, Campbell, CA (US); Wei Zeng, San Diego, CA (US); Ankit Bhamri, Bad Nauheim (DE)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 18/365,665

(22) Filed: Aug. 4, 2023

(65) Prior Publication Data

US 2025/0048281 A1      Feb. 6, 2025

(51) Int. Cl.
*H04W 74/0836* (2024.01)
*H04W 52/32* (2009.01)
*H04W 52/36* (2009.01)

(52) U.S. Cl.
CPC ....... *H04W 52/367* (2013.01); *H04W 52/325* (2013.01)

(58) Field of Classification Search
CPC ........... H04W 72/0446; H04W 52/325; H04W 52/146; H04W 52/143; H04W 52/04;
(Continued)

(56) References Cited

U.S. PATENT DOCUMENTS

| | | | |
|---|---|---|---|
| 2019/0320458 A1 | 10/2019 | Hosseini | |
| 2019/0356445 A1* | 11/2019 | Manolakos | .......... H04B 7/0805 |
| 2020/0389281 A1 | 12/2020 | Dinan | |

FOREIGN PATENT DOCUMENTS

| | | | |
|---|---|---|---|
| CN | 116368872 | 6/2023 | |
| WO | WO-2022126148 A2 * | 6/2022 | .......... H04L 5/0091 |

(Continued)

OTHER PUBLICATIONS

International Search Report and Written Opinion for PCT/US2024/040236; Nov. 13, 2024.
(Continued)

*Primary Examiner* — Tu X Nguyen
(74) *Attorney, Agent, or Firm* — Kowert, Hood, Munyon, Rankin & Goetzel, P.C.

(57) ABSTRACT

This disclosure relates to techniques for time division multiplexing sounding reference signal ports in a wireless communication system. A wireless device and a cellular base station may establish a wireless link. The wireless device may be configured to perform a sounding reference signal transmission with time division multiplexing sounding reference signal ports. A maximum transmit power for the wireless device for the sounding reference signal transmission may be determined based at least in part on the time division multiplexing sounding reference signal ports. A transmit power may be selected for the sounding reference signal transmission based at least in part on the maximum transmit power for the wireless device for the sounding reference signal transmission. The sounding reference signal transmission may be performed using the selected transmit power.

20 Claims, 6 Drawing Sheets

(58) Field of Classification Search
CPC . H04W 52/10; H04W 52/00; H04W 28/0289; H04W 28/0221; H04W 74/085; H04W 52/32; H04W 52/283; H04W 74/0825; H04W 74/0833; H04W 74/0836; H04W 74/0838; H04W 74/0866; H04W 52/08; H04W 76/28; H04W 52/38
See application file for complete search history.

(56) References Cited

FOREIGN PATENT DOCUMENTS

| | | | | |
|---|---|---|---|---|
| WO | WO-2022154925 A1 * | 7/2022 | ........... | H04B 7/0404 |
| WO | WO-2022238868 A1 * | 11/2022 | ........... | H04B 7/0404 |

OTHER PUBLICATIONS

CATT "On SRS enhancement for CJT and 8Tx operation"; 3GPP TSG RAN WG1 #113 R1-2304709; May 22, 2023.
ZTE "SRS enhancement targeting TDD CJT and 8 TX operation"; 3GPP TSG RAN WG1 Meeting #113 R1-2304396; May 22, 2023.

* cited by examiner

TIME DIVISION MULTIPLEXING SOUNDING REFERENCE SIGNAL PORTS

FIELD

The present application relates to wireless communications, and more particularly to systems, apparatuses, and methods for time division multiplexing sounding reference signal ports in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for supporting time division multiplexing sounding reference signal ports in a wireless communication system.

Techniques are described herein for determining the transmit power for a sounding reference signal transmission with time division multiplexing sounding reference signal ports. The techniques may account for the possibility that the maximum transmit power of a wireless device may be reduced for such a transmission, for example due to the use of only a subset of the antenna ports of the wireless device in each symbol of the sounding reference signal transmission, potentially depending on the wireless device architecture, the type of sounding reference signal transmission, and/or any of various other possible considerations.

Techniques are also described herein for implementing certain constraints on sounding reference signal transmissions with time division multiplexing sounding reference signal ports, for example to support efficient and effective operation. Further, a variety of possible sounding reference signal collision handling techniques are described herein, as well as techniques for configuring a wireless device with one of multiple such possible sounding reference signal collision handling techniques.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
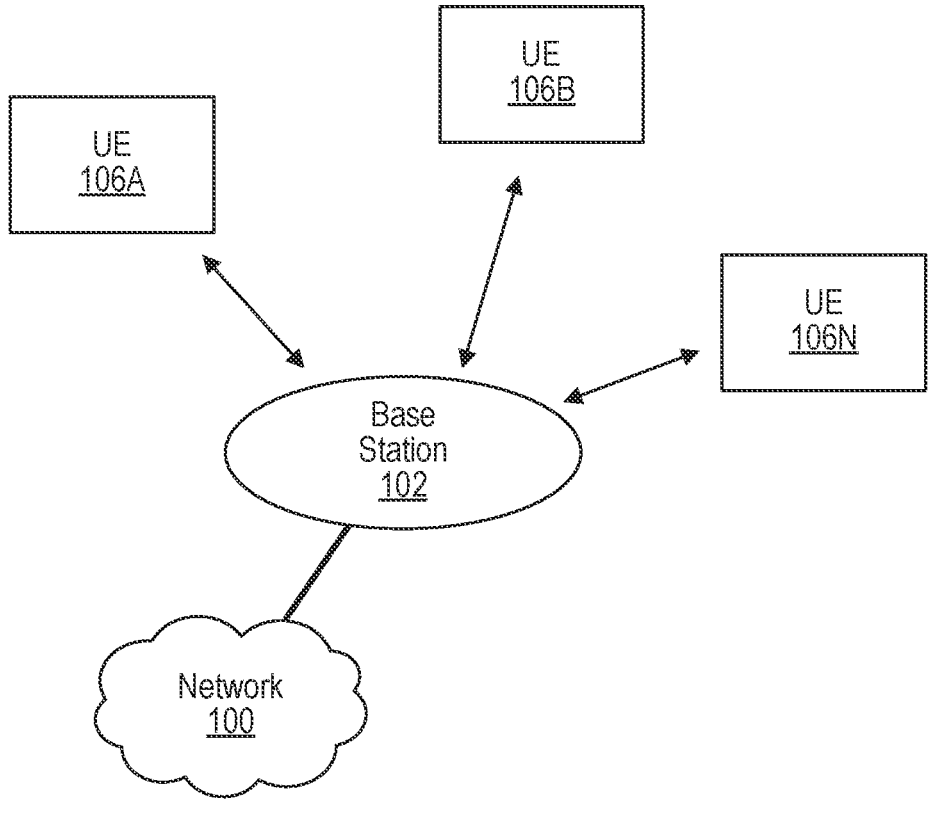
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment

RF: Radio Frequency

BS: Base Station

GSM: Global System for Mobile Communication

UMTS: Universal Mobile Telecommunication System

LTE: Long Term Evolution

NR: New Radio

TX: Transmission/Transmit

RX: Reception/Receive

RAT: Radio Access Technology

TRP: Transmission-Reception-Point

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well as any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
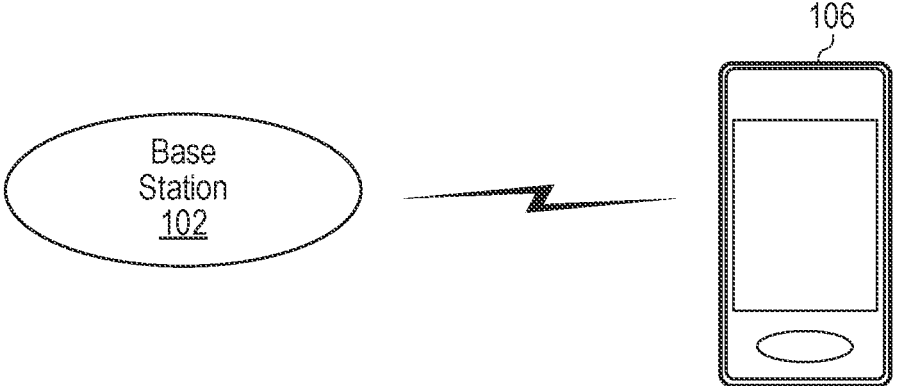
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Note that, at least in some 3GPP NR contexts, base station (gNB) functionality can be split between a centralized unit (CU) and a distributed unit (DU). The illustrated base station 102 may support the functionality of either or both of a CU or a DU, in such a network deployment context, at least according to some embodiments. In some instances, the base station 102 may be configured to act as an integrated access and backhaul (IAB) donor (e.g., including IAB donor CU and/or IAB donor DU functionality). In some instances, the base station 102 may be configured to act as an IAB node (e.g., including IAB mobile termination (MT) and IAB-DU functionality). Other implementations are also possible.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for time division multiplexing sounding reference signal ports in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

Figure 3:
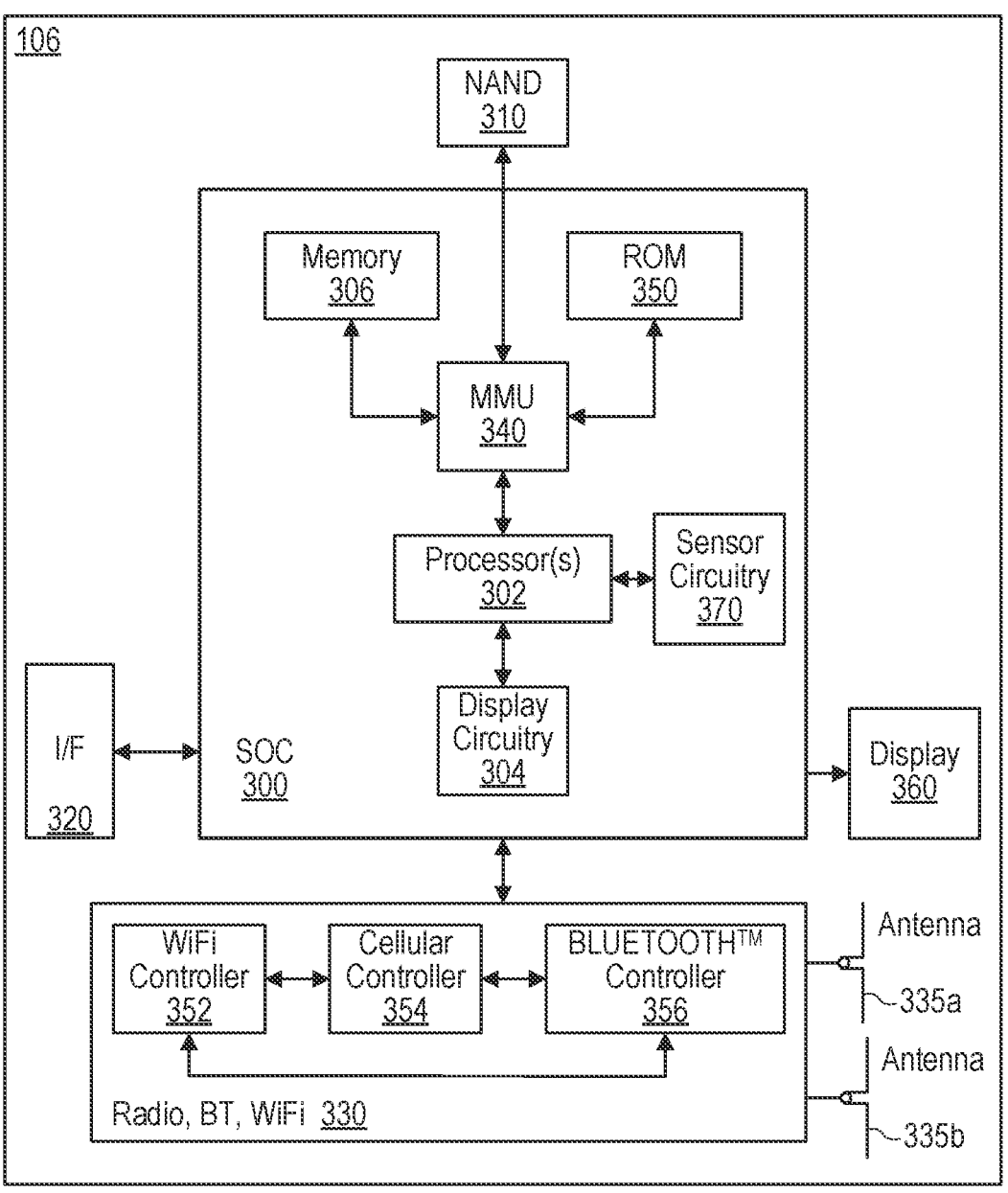
FIG. 3 illustrates an exemplary block diagram of a UE, according to some embodiments.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.
FIG. 3—Block Diagram of an Exemplary UE Device FIG. 3 illustrates a block diagram of an exemplary UE 106, according to some embodiments. As shown, the UE 106 may include a system on chip (SOC) 300, which may include portions for various purposes. Some or all of the various illustrated components (and/or other device components not illustrated, e.g., in variations and alternative arrangements) may be "communicatively coupled" or "operatively coupled," which terms may be taken herein to mean components that can communicate, directly or indirectly, when the device is in operation.

As shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for time division multiplexing sounding reference signal ports in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for time division multiplexing sounding reference signal ports in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
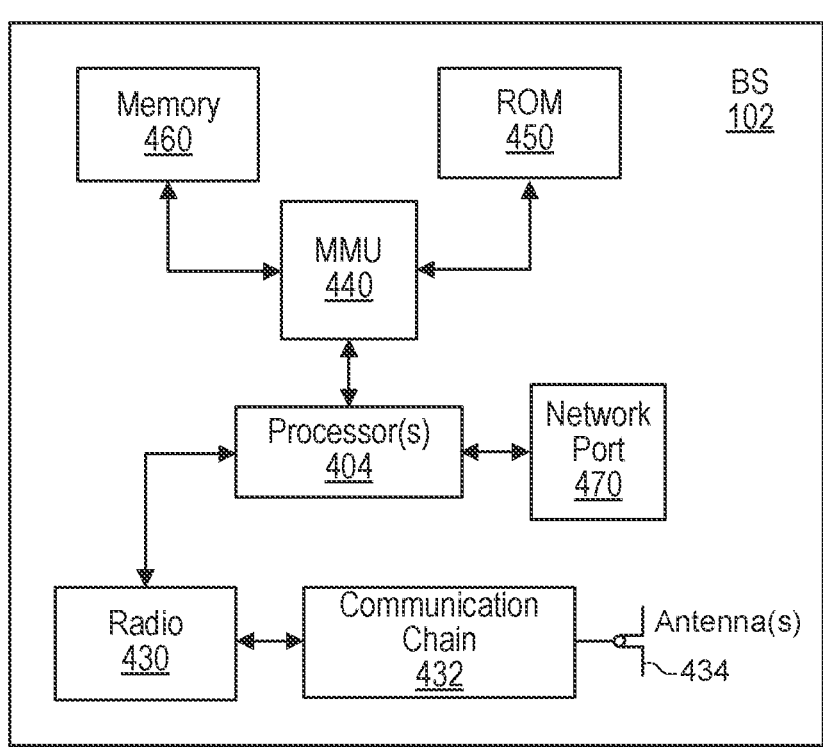
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
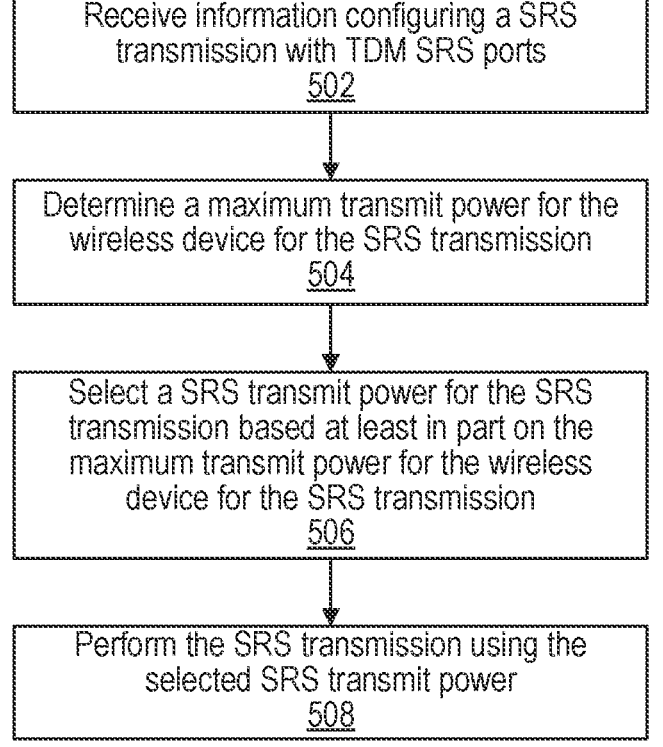
FIG. 5 is a flowchart diagram illustrating aspects of an exemplary possible method for time division multiplexing sounding reference signal ports in a wireless communication system, according to some embodiments.

FIG. 5—Time Division Multiplexing Sounding Reference Signal Ports

As sounding reference signal (SRS) design options have expanded in recent 3GPP releases, there may be multiple possibilities for both number of SRS ports and number of SRS symbols configured for a SRS transmission. In some (e.g., existing) configurations, it may be the case that all SRS ports configured for a SRS transmission are carried on each SRS symbol of the SRS transmission. However, at least for some SRS configurations, there may be benefits to supporting time division multiplexing (TDM) for SRS ports for a SRS transmission, for example such that different SRS ports are transmitted in different SRS symbols of the SRS transmission.

There may be some considerations for when operating with TDM SRS ports that differ from when operating with all SRS ports in every SRS symbol. Accordingly, it may be beneficial to specify techniques for supporting TDM SRS ports for a SRS transmission, at least in some instances. To illustrate one such set of possible techniques, FIG. 5 is a flowchart diagram illustrating a method for time division multiplexing sounding reference signal ports in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology, according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 502, the wireless device may receive information configuring a SRS transmission with TDM SRS ports. The SRS transmission may be a multi-port SRS transmission, such as an 8-port SRS transmission. The SRS transmission may be scheduled by the cellular base station using any of various types of configuration signaling, and may be a periodic, semi-persistent or aperiodic SRS transmission, according to various embodiments. For example, in some embodiments, at least some of the information configuring the SRS transmission may be provided using RRC signaling.

The configuration of TDM SRS ports for the SRS transmission may include an indication of a TDM factor for the SRS transmission, which may represent a number of SRS symbols over which the SRS ports are time division multiplexed for the SRS transmission. Thus, for an n-port SRS transmission with TDM factor s, it might be the case that each SRS symbol of the SRS transmission carries n/s SRS ports, with different SRS ports being used for each of a set of s SRS symbols. For example, for an 8-port SRS transmission with a TDM factor of 2, 4 ports may be used for each SRS symbol. In some instances, instead of signaling a TDM factor, it may be the case that the network can provide a yes/no type indication (e.g., a 1-bit flag) of whether TDM SRS ports are enabled, for example if only one value (e.g., 2) is supported as a possible TDM factor.

In some embodiments, the SRS transmission may include repetition and possibly frequency hopping. Configuration of such operation may include provision of one or more of a repetition factor R or a number of SRS symbols configured for the SRS transmission m. The repetition factor may indicate a number of repetitions of sets of s SRS symbols that are transmitted at a given frequency before frequency hopping. At least in some instances, the total number of SRS symbols configured for the SRS transmission may be required to be an integer multiple of the TDM factor multiplied by the repetition factor (e.g., m may be an integer multiple of sR). This may ensure that complete sets of s SRS symbols may be transmitted in the SRS transmission, at least according to some embodiments. Note that in some scenarios (e.g., with no repetition factor), it may be possible that m is only required to be an integer multiple of s, or that no such requirement is in place.

It may be possible that the SRS transmission is performed for any of a variety of possible purposes (e.g., codebook, non-codebook, antenna switching, beam management, as some possibilities), which may impact which SRS ports are selected for use in each of the SRS symbols of an SRS transmission with TDM SRS ports. For example, for a codebook-based SRS transmission with partial coherent operation, the SRS transmission may be performed such that SRS ports in the same coherent SRS port group are used in each symbol of the SRS transmission. In other words, the wireless device may avoid transmitting using SRS ports in different coherent SRS port groups in any given symbol of the SRS transmission. This may help provide more useful information for configuring future codebook-based uplink transmissions with partial coherent operation, and/or may allow for more power efficient operation (e.g., by avoiding turning on the same antenna panel in different SRS symbols of a set of SRS symbols for TDM SRS ports, as one possibility) at least according to some embodiments.

In 504, the wireless device may determine a maximum transmit power for the wireless device for the SRS transmission. The maximum transmit power for the wireless device for the SRS transmission may be determined based at least in part on the TDM SRS port configuration for the SRS transmission. For example, if fewer SRS ports are used in each SRS symbol of the SRS transmission than the total number of antenna ports of the wireless device, it may be possible that the maximum transmit power for the wireless device for the SRS transmission is less than it would be if all of the antenna ports of the wireless device were used, possibly also depending on other wireless device design considerations, such as the number and/or configuration arrangement of power amplifiers (PAS) for the wireless device.

Since the maximum transmit power for the wireless device for the SRS transmission may be at least partially dependent on wireless device design considerations, it may be possible that the wireless device can provide wireless device capability information to the cellular base station, which may be used in determining the maximum transmit power for the wireless device for the SRS transmission. For example, the wireless device may provide one or more maximum transmit power delta values for TDM SRS ports to the cellular base station as wireless device capability information, which may indicate a differential between a base maximum transmit power for the wireless device (e.g., which may also be explicitly or implicitly indicated in wireless device capability information) and a maximum transmit power for the wireless device when performing SRS transmission with one or more possible TDM SRS port configurations. As another example, the wireless device may provide wireless device power class information, from which one or more maximum transmit power values for the wireless device when performing SRS transmission with one or more possible TDM SRS port configurations can be inferred by the cellular base station.

In some embodiments, it may be possible that a single maximum transmit power delta value for TDM SRS ports is determined/indicated to cover all SRS transmission scenarios with TDM SRS ports. Alternatively, it may be possible that multiple maximum transmit power delta value for TDM SRS ports are determined/indicated, which may be applicable in different scenarios. For example, it could be possible that different maximum transmit power delta values for TDM SRS ports are determined and indicated for different SRS resource set usages, such as for SRS transmissions for codebook or antenna switching purposes, e.g., since at least for some wireless device architectures/designs, it may be possible that the maximum transmit power delta values for TDM SRS ports can differ for these different uses. As another example, it could be possible that different maximum transmit power delta values for TDM SRS ports are determined and indicated for different numbers of SRS ports and/or TDM factors, e.g., since at least for some wireless device designs, it may be possible that the maximum transmit power delta values for TDM SRS ports can differ depending on how many antenna elements of the wireless device are used to transmit in each SRS symbol of the SRS transmission.

In some embodiments, the cellular base may receive the wireless device capability information, determine one or more maximum transmit power values for the wireless device for SRS transmission with TDM SRS ports, and provide configuration information to the wireless device indicating the one or more maximum transmit power values for the wireless device for SRS transmission with TDM SRS ports. In some instances, if multiple maximum transmit power delta values for TDM SRS ports are provided by the wireless device, a corresponding number of maximum transmit power values for the wireless device for SRS transmission with TDM SRS ports may be determined and indicated by the cellular base station. Note that other configuration approaches are also possible. Such configuration may help ensure that the wireless device and the cellular base station determine the transmit power used by the wireless device for the SRS transmission in the same way, which may be important for more accurate and effective use of the SRS transmission for configuring subsequent uplink transmissions. Alternatively, it may be possible that such explicit configuration is not performed, for example if the cellular base station and wireless device behavior in determining maximum transmit power value(s) for the wireless device for SRS transmission with TDM SRS ports is sufficiently explicitly specified (e.g., in 3GPP technical specifications, as one possibility).

In 506, the wireless device may select a SRS transmit power for the SRS transmission based at least in part on the maximum transmit power for the wireless device for the SRS transmission. In some embodiments, SRS transmission power selection may be based on several considerations, which may also include an open loop power control calculation and a closed loop power control command. For example, it may be the case that the wireless device determines one possible transmit power value based on the open loop power control calculation and the closed loop power control command, and uses that value as the transmit power for the SRS transmission as long as it is less than or equal to the maximum transmit power for the wireless device for the SRS transmission. If that value is greater than the maximum transmit power for the wireless device for the SRS transmission, however, the wireless device may use the maximum transmit power for the wireless device for the SRS transmission as the transmit power for the SRS transmission.

Note that the cellular base station may also be able to determine the maximum transmit power for the wireless device for the SRS transmission (e.g., based on the wireless device capability information and the TDM SRS ports configuration), and to determine the SRS transmit power for the SRS transmission based at least in part on the maximum transmit power for the wireless device for the SRS transmission.

In 508, the wireless device may perform the SRS transmission using the selected SRS transmit power. This may include transmitting on each SRS symbol configured for the SRS transmission, with different SRS antenna ports used for different SRS symbols in each set of SRS symbols configured for TDM SRS ports. The SRS transmission from the wireless device may be received by the cellular base station. Note that the selected SRS transmit power may be split linearly across the configured antenna ports for each SRS symbol for the SRS transmission, at least according to some embodiments. The SRS transmission may be used to determine characteristics of the uplink channel between the wireless device and the cellular base station, which may in turn be used to configure future uplink transmissions from the wireless device to the cellular base station, at least as one possibility.

Note that it may be possible for one or more SRS symbols of the SRS transmission to experience transmission collision or pre-emption. For example, the cellular base station may determine, after configuring the SRS transmission, to instead use one or more symbols allocated for the SRS transmission for a different purpose, such as a high priority/low latency uplink transmission, and may accordingly provide a trans- mission pre-emption indication to the wireless device. The indication may be provided sufficiently in advance for a minimum processing time requirement consideration to be met for the wireless device, e.g., to ensure that the wireless device can identify that a given symbol of the SRS trans- mission is being pre-empted, at least according to some embodiments.

In such a scenario, there may be possible multiple ways of handling the SRS transmission including the pre-empted SRS symbol(s). As one such possibility, the wireless device may omit the first SRS symbol that has transmission colli- sion or pre-emption and all following SRS symbols of the SRS transmission. As another possibility, the wireless device may omit only SRS symbols of the SRS transmission that have transmission collision or pre-emption. As a still further possibility, the wireless device may omit the first set of SRS symbols for TDM SRS ports that have transmission collision or pre-emption and all following SRS symbols of the SRS transmission. As yet another possibility, the wireless device may omit only sets of SRS symbols for TDM SRS ports of the SRS transmission that have transmission collision or pre-emption. Note that, for each such possible approach, the beginning of the earliest SRS symbol among all SRS sym- bols that are omitted in the same slot is used when deter- mining the minimum processing time requirement consid- eration for SRS transmission omission, at least according to some embodiments.

Note that it may also be possible for the cellular base station to effectively implement the latter two approaches in a manner that is transparent to the wireless device, for example by always signaling SRS transmission omission starting at the first SRS symbol of a set of SRS symbols for TDM SRS ports and including SRS transmission omission for at least that full set of SRS symbols for TDM SRS ports, at least in some instances.

It may be the case that a wireless device can signal whether it supports one or more such approaches, for example using wireless device capability information. In some instances, one or more such possible approaches (e.g., the first approach, as one possibility) may be required to be supported by a wireless device that supports TDM SRS ports for SRS transmissions, while one or more other such approaches (e.g., the second, third, and fourth approaches, as one possibility) may be optional to be supported by a wireless device that supports TDM SRS ports for SRS transmissions. In some instances, the cellular base station may select a SRS collision handling approach (e.g., from those approaches supported by the wireless device, as indi- cated in the wireless device capability information) for the wireless device (e.g., for the SRS transmission in particular, or for SRS transmissions in general), and may provide an indication of the selected SRS collision handling approach to the wireless device. The wireless device may then use the indicated approach when performing SRS collision han- dling.

Figure 6:
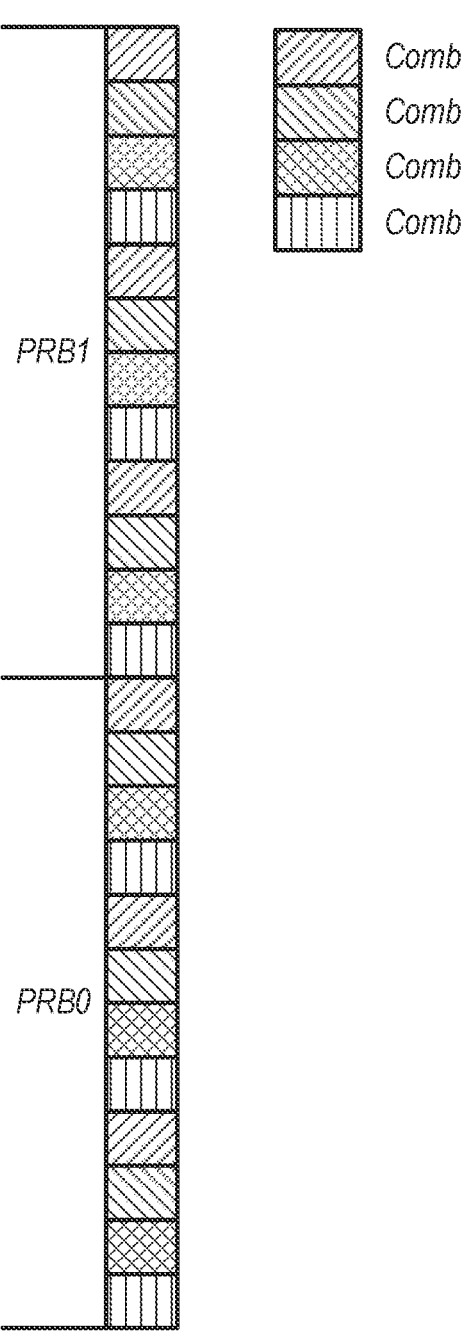
FIG. 6 illustrates example aspects of a possible comb structure with comb value 4, according to some embodiments.
Figure 7:
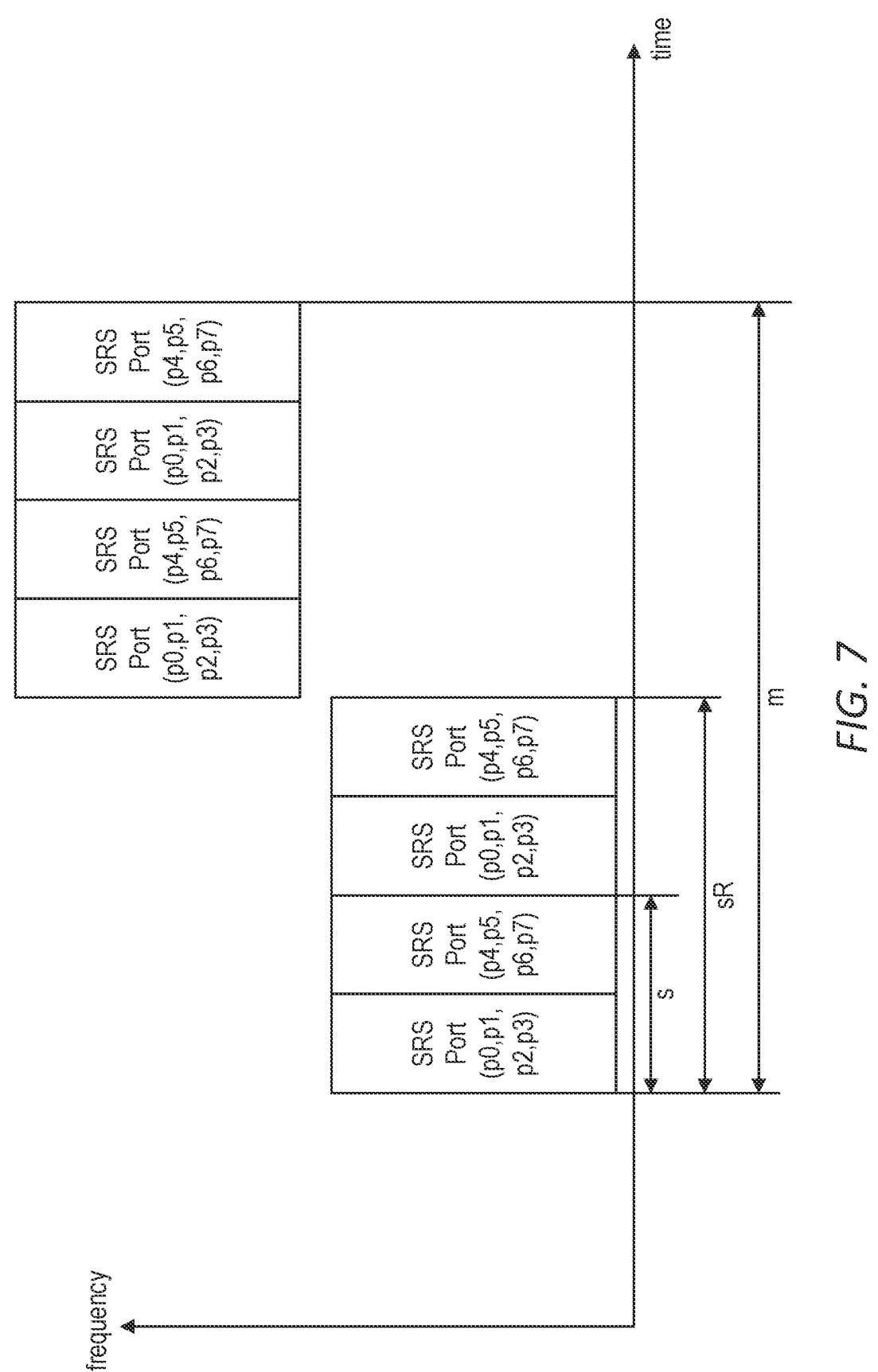
FIG. 7 illustrates example aspects of one possible time division multiplexed sounding reference signal port configuration, according to some embodiments.
Figure 8:
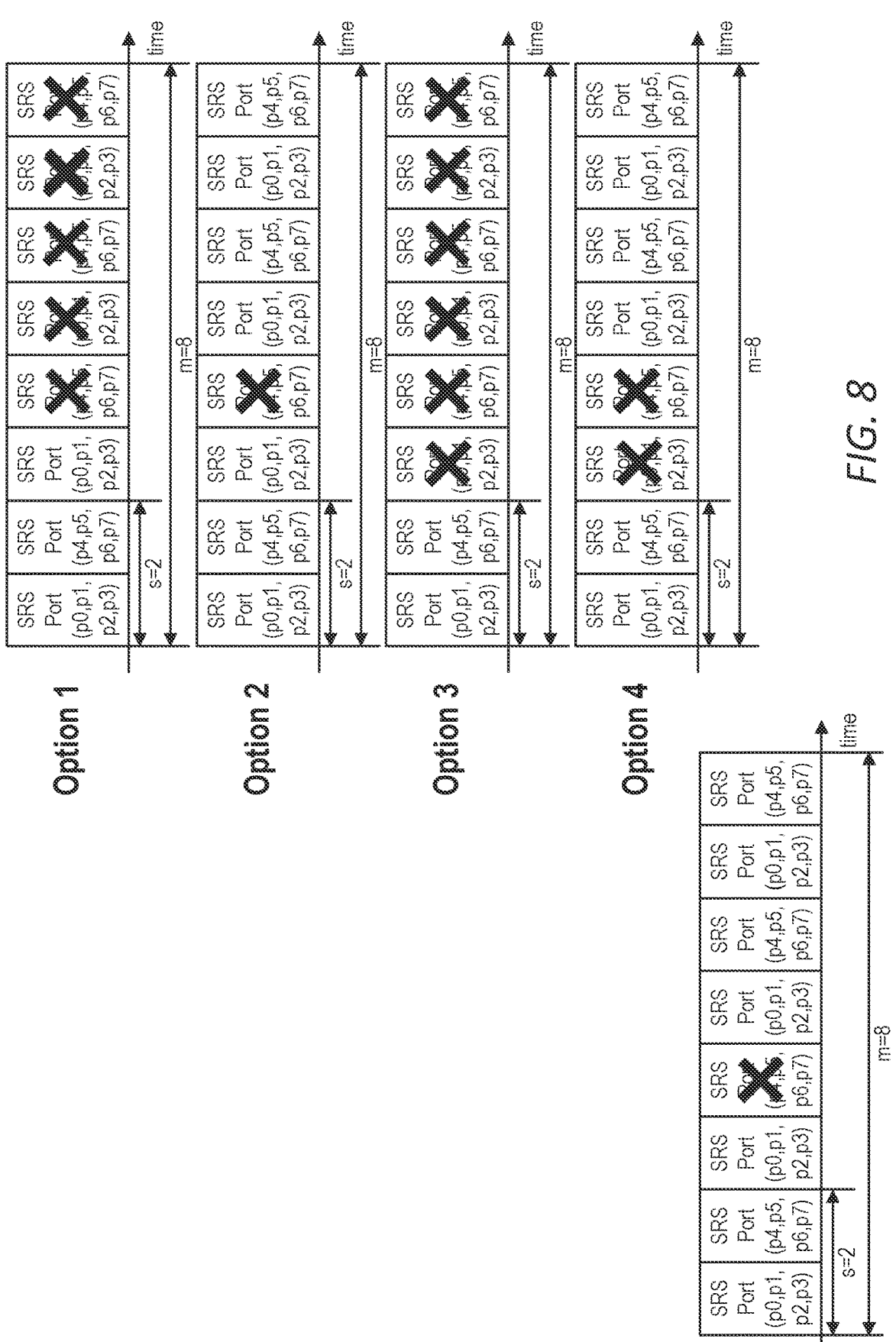
FIG. 8 illustrates example aspects of various possible collision handling options when sounding reference signal ports are time division multiplexed, according to some embodiments.

Thus, at least according to some embodiments, the method of FIG. 5 may be used to provide a framework according to which a wireless device can be configured to perform SRS transmissions with TDM SRS ports. This may increase the SRS scheduling options and flexibility for a cellular network, which may in turn improve network opera- tion efficiency, provide improved wireless device performance, and/or reduce wireless device power consumption, among various possible benefits, at least in some instances.
FIGS. 6-8 and Additional Information FIGS. 6-8 illustrate further aspects that might be used in conjunction with the method of FIG. 5 if desired. It should be noted, however, that the exemplary details illustrated in and described with respect to FIGS. 6-8 are not intended to be limiting to the disclosure as a whole: numerous variations and alternatives to the details provided herein below are possible and should be considered within the scope of the disclosure.

A variety of sounding reference signal (SRS) designs have been introduced and used in various 3GPP releases. In 3GPP NR Release 15, some SRS design highlights may include that SRS can only be transmitted in the last 6 symbols of a slot, that SRS can be repeated for up to 4 symbols, and that SRS supports comb 2 or 4. 3GPP NR Release 16 SRS design highlights may include that SRS can be transmitted in any symbol of a slot, that SRS repetition with 8 or 12 symbols is supported, and that SRS supports comb 8 with 1 or 2 SRS ports. 3GPP NR Release 17 may include further enhance- ments for SRS coverage and capability, for example includ- ing support for resource block (RB) level partial frequency sounding (RPFS). For RFPS, start physical RB (PRB) location hopping may be supported. Additionally, SRS rep- etition with 10 or 14 symbols may be supported, and for comb 8, a maximum of 6 cyclic shifts and 4 SRS ports may be supported.

Thus, in current NR, at least according to some embodi- ments, multiple SRS symbols can be used for repetition to improve coverage, with candidate numbers of SRS symbols for repetition potentially including {n1, n2, n4, n8, n10, n12, n14}, and when multiple ports of SRS are configured, each SRS symbol may carry the same number of ports.

As a possible extension of such a design, it may be beneficial to support time division multiplexing (TDM) for SRS ports. Thus, when multiple SRS symbols are used for 8-port SRS transmission, the 8 SRS ports may be time division multiplexed, such that different SRS ports may be transmitted in different SRS symbols. In this disclosure, various possible design details for supporting TDM SRS ports are described, at least according to some embodiments. These include design details relating to SRS power control, TDM SRS ports restriction, and SRS collision handling.

SRS sequence lengths supported in NR SRS may include {6, 12, 18, 24, any sequence≥36}, in some embodiments. An SRS sequence may be mapped to frequency domain resources, (e.g., resource elements (REs)), with a certain comb structure. NR SRS may support comb structures with a comb value of 2, 4, or 8. A comb N (e.g., N=2/4/8) may subsample REs with a factor N; different combs may be orthogonal since they may be non-overlapping in frequency. FIG. 6 illustrates RE mappings of various possible comb offsets (e.g., 0/1/2/3) with a comb factor of 4, as one example.

Multiple cyclic shift sequences (e.g., discrete Fourier transforms to create orthogonal tones) can be applied on top of the same SRS sequence, in some embodiments. A length M cyclic shift sequence can have M orthogonal sequences, in some instances. This can create M orthogonal SRS sequences using the same SRS comb offset. The cyclic shift sequence length M may be a function of comb size N, in some embodiments (e.g., in 3GPP TS 38.211 v.17.5.0); as one possibility, comb 2 may have a maximum 8 cyclic shifts, comb 4 may have a maximum 12 cyclic shifts, and comb 8 may have a maximum 6 cyclic shifts.

SRS power control in 3GPP TS 38.213 v.17.6.0 may specify that for SRS, a UE splits a linear value $\hat{P}_{SRS,b,f,c}(i, q_s, l)$ of the transmit power $P_{SRS,b,f,c}(i, q_s, l)$ on active uplink (UL) bandwidth part (BWP) b of carrier f of serving cell c equally across the configured antenna ports for SRS. If a UE transmits SRS based on a configuration by SRS-Resource-Set on active UL BWP b of carrier f of serving cell c using SRS power control adjustment state with index l, the UE may determine the SRS transmission power in an SRS transmission occasion i as:

$$P_{SRS,b,f,c}(i, q_s, l) =$$

$$\min\left\{\begin{array}{l} P_{CMAX,f,c}(i) \\ P_{O\_SRS,b,f,c}(q_s) + 10\log_{10}(2^{\mu} \cdot M_{SRS,b,f,c}(i)) + \\ \alpha_{SRS,b,f,c}(q_s) \cdot PL_{b,f,c}(q_d) + h_{b,f,c}(i, l) \end{array}\right\}[dBm]$$

When SRS ports are time division multiplexed, since a UE is not using all the SRS ports for a given SRS symbol, it may be the case (e.g., depending on UE design) that the UE is not able to transmit at $P_{CMAX,f,c}(i)$.

For multi-port (e.g., 8-port) SRS when TDM SRS ports are configured, if a UE is not able to transmit at $P_{CMAX,f,c}(i)$ due to the reduced number of ports per SRS symbol, it may be the case that the UE can transmit with a maximum power of $$P_{CMAX,f,c}^{TDM}(i)$$

for each SRS symbol, e.g., where $$P_{CMAX,f,c}^{TDM}(i) < P_{CMAX,f,c}(i).$$

To account for this scenario, it may be possible that the equation in 3GPP TS 38.213 v.17.6.0 clause 7.3.1 is updated so that $P_{CMAX,f,c}(i)$ is replaced with $$P_{CMAX,f,c}^{TDM}(i),$$

in which $$P_{CMAX,f,c}^{TDM}(i)$$

is the maximum transmit power the UE can use for TDM SRS ports. Alternatively, it may be the case that the 3GPP technical specifications are not updated in this way, and that the calculation of $P_{CMAX,f,c}(i)$ may be left up to UE implementation based on the reduced number of ports.

For multi-port (e.g., 8-port) SRS, when TDM SRS ports are configured, if a UE is not able to transmit at $P_{CMAX,f,c}(i)$ and $P_{CMAX,f,c}(i)$ in the equation in 3GPP TS 38.213 v.17.6.0 clause 7.3.1 is replaced with $$P_{CMAX,f,c}^{TDM}(i),$$

in terms of $$P_{CMAX,fc}^{TDM}(i),$$

it may be the case that a UE can report the delta (e.g., $\Delta^{TDM}$) to the network as part of UE capability reporting, where:

$$P_{CMAX,f,c}^{TDM}(i) = P_{CMAX,f,c}(i) - \Delta^{TDM}$$

$\Delta^{TDM}$ can be {0 dB, 3 dB}, etc.
In some embodiments, $$P_{CMAX,f,c}^{TDM}(i)$$

may additionally or alternatively be determined for a UE by the network based on the UE power class and the TDM SRS port configuration. The UE power class may be reported as a UE capability.

Note further, that in scenarios in which a UE needs to report either $\Delta^{TDM}$ or power class for the network to determine $$P_{CMAX,f,c}^{TDM}(i)$$

for the UE, it may be possible that the same value is reported for both a SRS resource set with usage 'codebook' or 'antennaSwitching', or that different values can be reported in a SRS resource set with usage 'codebook and 'antennaSwitching', according to various embodiments.

In some instances, in scenarios in which a UE needs to report either $\Delta^{TDM}$ or power class for the network to determine $$P_{CMAX,f,c}^{TDM}(i)$$

for the UE, the final maximum transmit power used for $$P_{CMAX,f,c}^{TDM}(i)$$

calculation can be configured by the network via radio resource control (RRC) signaling. Note that it may be the case that the RRC configured maximum transmit power may not be allowed to exceed the UE reported capability, or else the UE reported capability may be used for the $$P_{CMAX,f,c}^{TDM}(i)$$

calculation.
Note that if the final maximum transmit power used for $$P_{CMAX,f,c}^{TDM}(i)$$

calculation can be configured by the network via RRC, it may be possible that the same maximum transmit power is configured by the network for both a SRS resource set with usage 'codebook' or 'antennaSwitching', or that different maximum transmit powers can be configured by the network in a SRS resource set with usage 'codebook and 'antennaSwitching', according to various embodiments.

In some instances, it may be the case that SRS port time division multiplexing can be configured over different numbers of symbols; for example, for 8-port SRS configuration, it could be possible that s={2, 4, 8} are possible values for the number of SRS symbols for TDM SRS ports, which may impact the impact on maximum transmit power possible for a given UE. Accordingly, in some embodiments, in addition or as an alternative to other considerations, it may be the case that the $\Delta^{TDM}$ value reported by a UE depends at least in part on the configured s parameter for the SRS port TDM configuration, and/or that different $\Delta^{TDM}$ values can be reported by a UE for different s values. As one example, a UE could thus report:

$$\Delta^{TDM} = 0 \text{ dB for } s = 2$$
$$\Delta^{TDM} = 3 \text{ dB for } s = 2$$
$$\Delta^{TDM} = 6 \text{ dB for } s = 8$$

Numerous other reporting options are also possible.

FIG. 7 illustrates example aspects of one possible time division multiplexed sounding reference signal port configuration, according to some embodiments. The configuration parameters used in the illustrated configuration may include m, the number of SRS symbols in a slot (e.g., nrofSymbols configured in SRS-Resource), s, the number of SRS symbols for TDM SRS ports, and R, the number of repeated s symbols for frequency hopping (e.g., repetitionFactor configured in SRS-Resource). In the illustrated scenario, s=2, R=2, and m=8.

Given such a configuration framework, it may be useful to place certain restrictions on the parameter values, e.g., to facilitate effective operation in a 3GPP NR communication system, at least according to some embodiments. As one such example, when TDM SRS ports are configured (e.g., for 8-port SRS), it may be the case that m must be an integer multiple of sR. As another possibility, when TDM SRS ports are configured, for 'codebook' based SRS transmission, for partial coherent operation, it may be the case that a UE is not expected to transmit the SRS ports in the same coherent SRS port group in different symbols among a given set of s SRS symbols. Thus, in some embodiments, when the number of coherent SRS port groups is 2 ($N_g$=2), each with 4 SRS ports (e.g., for 8-port SRS), it may be the case that SRS port {1000, 1001, 1004, 1005} must be transmitted in the same symbol, and that SRS port {1002, 1003, 1006, 1007} must be transmitted in the same symbol. Using a similar framework, when the number of coherent SRS port groups is 4 ($N_g$=4), each with 2 SRS ports (e.g., for 8-port SRS), it may be the case that SRS port {1000, 1004} must be transmitted in the same symbol, {1001, 1005} must be transmitted in the same symbol, {1002, 1006} must be transmitted in the same symbol, and {1003, 1007} must be transmitted in the same symbol.

When TDM SRS ports are configured, if one or multiple SRS symbols experience transmission collision/pre-emption, there may be multiple options for handling such transmission collision/pre-emption. FIG. 8 illustrates example aspects of various such possible collision handling options, according to some embodiments. As shown, in the illustrated scenario, SRS TDM parameters s=2 and m=8 may be configured, and SRS symbol 3 may have transmission collision/pre-emption. As one option, it may be the case that the first SRS symbol that has transmission collision/pre-emption and all the following SRS symbols are omitted. Thus, in the illustrated scenario (shown as "option 1"), SRS symbols 3-7 may be omitted. As another option, only the SRS symbols that have transmission collision/pre-emption are omitted. Thus, in the illustrated scenario (shown as "option 2"), SRS symbol 3 may be omitted. As still another option, the first subset of s SRS symbols that has transmission collision/pre-emption and all the following SRS symbols are omitted. Thus, in the illustrated scenario (shown as "option 3"), SRS symbols 2-7 may be omitted. As yet another option, only the subset of s SRS symbols that have transmission collision/pre-emption are omitted. Thus, in the illustrated scenario (shown as "option 4"). SRS symbols 2-3 may be omitted.

In some embodiments, in order to determine the minimum processing time that is needed for SRS transmission omission in such scenarios, it may be the case that the earliest SRS symbol among all the SRS symbols that are omitted in the same slot is used to determine the minimum processing time requirement consideration. Thus, in such embodiments, earlier timing may be needed for SRS transmission omission for the third and fourth options described than in the first and second options described, at least in some instances.

In some embodiments, support for one or more collision handling options for when TDM SRS ports are configured and one or multiple of the SRS symbols experience transmission collision/pre-emption may be considered basic or required UE features, while other such collision handling options may be considered optional UE features. For example, it could be the case that "option 1" (e.g., the first SRS symbol that has transmission collision/pre-emption and all the following SRS symbols being omitted) is the basic UE feature, while options 2 (e.g., only the SRS symbols that have transmission collision/pre-emption being omitted), 3 (e.g., the first subset of s SRS symbols that has transmission collision/pre-emption and all the following SRS symbols being omitted), and 4 (e.g., only the subset of s SRS symbols that have transmission collision/pre-emption being omitted) are optional UE features. In such a scenario, even for a UE that supports TDM SRS ports, it may be the case that the UE does not need to support options 2, 3, or 4. After the UE reports its capability in this regard, the network may configure the option to be used for SRS collisions. It may be the case that such configuration does not exceed the UE capability (e.g., does not configure an option not supported by the UE).

In the following further exemplary embodiments are provided.

One set of embodiments may include a method, comprising: by a wireless device: receiving information configuring a sounding reference signal (SRS) transmission with time division multiplexing (TDM) SRS ports; determining a maximum transmit power for the wireless device for the SRS transmission based at least in part on the TDM SRS ports; selecting an SRS transmit power for the SRS transmission based at least in part on the maximum transmit power for the wireless device for the SRS transmission; and performing the SRS transmission using the selected SRS transmit power.

According to some embodiments, the method further comprises: providing wireless device capability information to a cellular base station, wherein the maximum transmit power for the wireless device for the SRS transmission is determined based at least in part on the wireless device capability information provided to the cellular base station.

According to some embodiments, the wireless device capability information indicates one or more of: one or more maximum transmit power delta values for TDM SRS ports, wherein the one or more maximum transmit power delta values for TDM SRS ports are used in calculating maximum transmit power for the wireless device for SRS transmissions from a baseline maximum transmit power for the wireless device; or wireless device power class information for the wireless device.

According to some embodiments, the wireless device capability information indicates a value used for determining maximum transmit power for the wireless device for SRS transmissions for each of multiple different SRS resource set usages.

According to some embodiments, the wireless device capability information indicates a value used for determining maximum transmit power for the wireless device for SRS transmissions that applies for multiple different SRS resource set usages.

According to some embodiments, the maximum transmit power for the wireless device for the SRS transmission is further determined based at least in part on a number of SRS symbols for TDM SRS ports configured for the SRS transmission.

Another set of embodiments may include an apparatus, comprising: a processor configured to cause a wireless device to: receive information configuring a sounding reference signal (SRS) transmission with time division multiplexing (TDM) SRS ports; select an SRS transmit power for the SRS transmission based at least in part on the TDM SRS ports; and perform the SRS transmission using the selected SRS transmit power.

According to some embodiments, the processor is further configured to cause the wireless device to: provide wireless device capability information to a cellular base station; and receive configuration information from the cellular base station indicating a maximum transmit power for the wireless device for SRS transmission with TDM SRS ports, wherein the maximum transmit power for the wireless device for SRS transmission with TDM SRS ports is determined based at least in part on the wireless device capability information, wherein the SRS transmit power for the SRS transmission is determined based at least in part on the maximum transmit power for the wireless device for SRS transmission with TDM SRS ports.

According to some embodiments, the configuration information received from the cellular base station indicates a maximum transmit power for the wireless device for SRS transmission with TDM SRS ports for each of multiple different SRS resource set usages.

According to some embodiments, the configuration information received from the cellular base station indicates a maximum transmit power for the wireless device for SRS transmission with TDM SRS ports that applies for multiple different SRS resource set usages.

According to some embodiments, the information configuring the SRS transmission indicates: a number of SRS symbols for TDM SRS ports configured for the SRS transmission: 's'; a number of repeated sets of s SRS symbols for frequency hopping configured for the SRS transmission: 'R'; and a number of SRS symbols in a slot configured for the SRS transmission: m, wherein m is an integer multiple of sR.

According to some embodiments, the SRS transmission is a codebook-based SRS transmission with partial coherent operation, wherein, in each SRS symbol of the SRS transmission, the SRS transmission is performed using SRS ports in a same coherent SRS port group.

According to some embodiments, the processor is further configured to cause the wireless device to: determine an SRS collision handling approach for the SRS transmission in case one or more SRS symbols of the SRS transmission experience transmission collision or pre-emption.

According to some embodiments, the SRS collision handling approach includes one of: omitting the first SRS symbol that has transmission collision or pre-emption and all following SRS symbols of the SRS transmission; omitting only SRS symbols of the SRS transmission that have transmission collision or pre-emption; omitting the first set of SRS symbols for TDM SRS ports that have transmission collision or pre-emption and all following SRS symbols of the SRS transmission; or omitting only sets of SRS symbols for TDM SRS ports of the SRS transmission that have transmission collision or pre-emption.

According to some embodiments, a beginning of an earliest SRS symbol among all SRS symbols that are omitted in a same slot is used for a minimum processing time requirement consideration for SRS transmission omission.

Yet another set of embodiments may include a cellular base station, comprising: an antenna; a radio operably coupled to the antenna; and a processor operably coupled to the radio; wherein the cellular base station is configured to: provide information to a wireless device configuring a sounding reference signal (SRS) transmission with time division multiplexing (TDM) SRS ports; and receive, at an SRS transmit power, the SRS transmission from the wireless device, wherein the SRS transmit power is determined based at least in part on a maximum transmit power for the wireless device for the SRS transmission, and wherein the maximum transmit power is determined based at least in part on the TDM SRS ports.

According to some embodiments, the cellular base station is further configured to: receive wireless device capability information from the wireless device; determine one or more maximum transmit power values for the wireless device for SRS transmission with TDM SRS ports based at least in part on the wireless device capability information; and transmit configuration information to the wireless device indicating the one or more maximum transmit power values for the wireless device for SRS transmission with TDM SRS ports.

According to some embodiments, the wireless device capability information includes a maximum transmit power delta value for the wireless device for SRS transmission with TDM SRS ports for each of one or more of: one or more SRS resource set usages; or one or more numbers of SRS symbols for TDM SRS ports.

According to some embodiments, the information configuring the SRS transmission indicates one or more of: a number of SRS symbols for TDM SRS ports configured for the SRS transmission: 's'; a number of repeated sets of s SRS symbols for frequency hopping configured for the SRS transmission: 'R'; and a number of SRS symbols in a slot configured for the SRS transmission: m, wherein m is an integer multiple of sR.

According to some embodiments, the cellular base station is further configured to: receive wireless device capability information indicating whether one or more SRS collision handling approaches are supported by the wireless device; select a SRS collision handling approach for the wireless device based at least in part on the wireless device capability information indicating whether one or more SRS collision handling approaches are supported by the wireless device; and transmit an indication of the selected SRS collision handling approach to the wireless device.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processor configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:

by a wireless device:

receiving information configuring a sounding reference signal (SRS) transmission with time division multiplexing (TDM) SRS ports;

determining a maximum transmit power for the wireless device for the SRS transmission based at least in part on the TDM SRS ports;

selecting an SRS transmit power for the SRS transmission based at least in part on the maximum transmit power for the wireless device for the SRS transmission;

performing the SRS transmission using the selected SRS transmit power; and determining an SRS collision handling approach for the SRS transmission in case one or more SRS symbols of the SRS transmission experience transmission collision or pre-emption, wherein the SRS collision handling approach includes one of:

omitting a first SRS symbol that has transmission collision or pre-emption and all following SRS symbols of the SRS transmission;

omitting only SRS symbols of the SRS transmission that have transmission collision or pre-emption;

omitting a first set of SRS symbols for TDM SRS ports that have transmission collision or pre-emption and all following SRS symbols of the SRS transmission; or omitting only sets of SRS symbols for TDM SRS ports of the SRS transmission that have transmission collision or pre-emption.

2. The method of claim 1, wherein the method further comprises:

providing wireless device capability information to a cellular base station, wherein the maximum transmit power for the wireless device for the SRS transmission is determined based at least in part on the wireless device capability information provided to the cellular base station.

3. The method of claim 2, wherein the wireless device capability information indicates one or more of:

one or more maximum transmit power delta values for TDM SRS ports, wherein the one or more maximum transmit power delta values for TDM SRS ports are used in calculating maximum transmit power for the wireless device for SRS transmissions from a baseline maximum transmit power for the wireless device; or wireless device power class information for the wireless device.

4. The method of claim 2, wherein the wireless device capability information indicates a value used for determining maximum transmit power for the wireless device for SRS transmissions for each of multiple different SRS resource set usages.

25

5. The method of claim 2,
wherein the wireless device capability information indicates a value used for determining maximum transmit power for the wireless device for SRS transmissions that applies for multiple different SRS resource set usages.

6. The method of claim 1,
wherein the maximum transmit power for the wireless device for the SRS transmission is further determined based at least in part on a number of SRS symbols for TDM SRS ports configured for the SRS transmission.

7. An apparatus, comprising:
a processor configured to cause a wireless device to:
receive information configuring a sounding reference signal (SRS) transmission with time division multiplexing (TDM) SRS ports;
select an SRS transmit power for the SRS transmission based at least in part on the TDM SRS ports;
perform the SRS transmission using the selected SRS transmit power; and
determine an SRS collision handling approach for the SRS transmission in case one or more SRS symbols of the SRS transmission experience transmission collision or pre-emption, wherein the SRS collision handling approach includes one of:
   omitting a first SRS symbol that has transmission collision or pre-emption and all following SRS symbols of the SRS transmission;
   omitting only SRS symbols of the SRS transmission that have transmission collision or pre-emption;
   omitting a first set of SRS symbols for TDM SRS ports that have transmission collision or pre-emption and all following SRS symbols of the SRS transmission; or
   omitting only sets of SRS symbols for TDM SRS ports of the SRS transmission that have transmission collision or pre-emption.

8. The apparatus of claim 7, wherein the processor is further configured to cause the wireless device to:
   provide wireless device capability information to a cellular base station; and
   receive configuration information from the cellular base station indicating a maximum transmit power for the wireless device for SRS transmission with TDM SRS ports, wherein the maximum transmit power for the wireless device for SRS transmission with TDM SRS ports is determined based at least in part on the wireless device capability information,
   wherein the SRS transmit power for the SRS transmission is determined based at least in part on the maximum transmit power for the wireless device for SRS transmission with TDM SRS ports.

9. The apparatus of claim 8,
wherein the configuration information received from the cellular base station indicates a maximum transmit power for the wireless device for SRS transmission with TDM SRS ports for each of multiple different SRS resource set usages.

10. The apparatus of claim 8,
wherein the configuration information received from the cellular base station indicates a maximum transmit power for the wireless device for SRS transmission with TDM SRS ports that applies for multiple different SRS resource set usages.

11. The apparatus of claim 7,
wherein the information configuring the SRS transmission indicates:

26 a number of SRS symbols for TDM SRS ports configured for the SRS transmission: 's';
a number of repeated sets of s SRS symbols for frequency hopping configured for the SRS transmission: 'R'; and
a number of SRS symbols in a slot configured for the SRS transmission: m,
wherein m is an integer multiple of sR.

12. The apparatus of claim 7,
wherein the SRS transmission is a codebook-based SRS transmission with partial coherent operation,
wherein, in each SRS symbol of the SRS transmission, the SRS transmission is performed using SRS ports in a same coherent SRS port group.

13. The apparatus of claim 7,
wherein a beginning of an earliest SRS symbol among all SRS symbols that are omitted in a same slot is used for a minimum processing time requirement consideration for SRS transmission omission.

14. A cellular base station, comprising:
an antenna;
a radio operably coupled to the antenna; and
a processor operably coupled to the radio;
wherein the cellular base station is configured to:
provide information to a wireless device configuring a sounding reference signal (SRS) transmission with time division multiplexing (TDM) SRS ports;
receive, at an SRS transmit power, the SRS transmission from the wireless device, wherein the SRS transmit power is determined based at least in part on a maximum transmit power for the wireless device for the SRS transmission, and wherein the maximum transmit power is determined based at least in part on the TDM SRS ports;
receive wireless device capability information indicating whether one or more SRS collision handling approaches are supported by the wireless device, wherein the one or more SRS collision handling approaches include one of:
   omitting a first SRS symbol that has transmission collision or pre-emption and all following SRS symbols of the SRS transmission;
   omitting only SRS symbols of the SRS transmission that have transmission collision or pre-emption;
   omitting a first set of SRS symbols for TDM SRS ports that have transmission collision or pre-emption and all following SRS symbols of the SRS transmission; or
   omitting only sets of SRS symbols for TDM SRS ports of the SRS transmission that have transmission collision or pre-emption;
select a SRS collision handling approach for the wireless device based at least in part on the wireless device capability information indicating whether the one or more SRS collision handling approaches are supported by the wireless device; and
transmit an indication of the selected SRS collision handling approach to the wireless device.

15. The cellular base station of claim 14, wherein the cellular base station is further configured to:
   receive wireless device capability information from the wireless device;
   determine one or more maximum transmit power values for the wireless device for SRS transmission with TDM SRS ports based at least in part on the wireless device capability information; and transmit configuration information to the wireless device indicating the one or more maximum transmit power values for the wireless device for SRS transmission with TDM SRS ports.

16. The cellular base station of claim 15, wherein the wireless device capability information includes a maximum transmit power delta value for the wireless device for SRS transmission with TDM SRS ports for each of one or more of:

one or more SRS resource set usages; or one or more numbers of SRS symbols for TDM SRS ports.

17. The cellular base station of claim 14, wherein the information configuring the SRS transmission indicates one or more of:

a number of SRS symbols for TDM SRS ports configured for the SRS transmission: 's';

a number of repeated sets of s SRS symbols for frequency hopping configured for the SRS transmission: 'R'; and a number of SRS symbols in a slot configured for the SRS transmission: m, wherein m is an integer multiple of sR.

18. The cellular base station of claim 14, wherein a beginning of an earliest SRS symbol among all SRS symbols that are omitted in a same slot is used for a minimum processing time requirement consideration for SRS transmission omission.

19. The cellular base station of claim 14, wherein the cellular base station is further configured to:

signal SRS transmission omission starting at a first SRS symbol of a set of SRS symbols for TDM SRS ports and including SRS transmission omission for at least a full set of SRS symbols for TDM SRS ports.

20. The cellular base station of claim 14, wherein the processor is a baseband processor.

* * * * *